United States Patent
Gerlach

(12) United States Patent
(10) Patent No.: US 8,711,962 B2
(45) Date of Patent: Apr. 29, 2014

(54) METHOD FOR GENERATING MULTI-ANTENNA SIGNALS

(75) Inventor: Heino Gerlach, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 215 days.

(21) Appl. No.: 12/921,373

(22) PCT Filed: Feb. 27, 2009

(86) PCT No.: PCT/EP2009/001427
§ 371 (c)(1),
(2), (4) Date: Nov. 18, 2010

(87) PCT Pub. No.: WO2009/109340
PCT Pub. Date: Sep. 11, 2009

(65) Prior Publication Data
US 2011/0058620 A1    Mar. 10, 2011

(30) Foreign Application Priority Data
Mar. 7, 2008    (DE) .................. 10 2008 013 011

(51) Int. Cl.
*H04B 7/02*        (2006.01)

(52) U.S. Cl.
USPC .......................................... 375/267

(58) Field of Classification Search
USPC ......... 375/260, 267, 316, 340–341, 346–347, 375/349
See application file for complete search history.

(56) References Cited

U.S. PATENT DOCUMENTS

| | | | |
|---|---|---|---|
| 7,003,310 B1 * | 2/2006 | Youssefmir et al. ........... | 455/522 |
| 7,095,814 B2 * | 8/2006 | Kyeong et al. ................ | 375/347 |
| 7,394,861 B1 * | 7/2008 | Tang et al. .................... | 375/267 |
| 2003/0050020 A1 | 3/2003 | Erceg | |
| 2006/0153312 A1 * | 7/2006 | Yun et al. ...................... | 375/267 |
| 2009/0080558 A1 * | 3/2009 | An ................................. | 375/267 |

FOREIGN PATENT DOCUMENTS

| | | |
|---|---|---|
| DE | 11 2006 000 207 T5 | 11/2007 |
| EP | 1 858 180 A1 | 11/2007 |
| WO | 03/041308 A1 | 5/2003 |
| WO | 2006/026799 A2 | 3/2006 |
| WO | 2008/132268 A1 | 11/2008 |

OTHER PUBLICATIONS

English Translation of International Preliminary Report on Patentability mailed Dec. 29, 2010, in corresponding International Application No. PCT/EP2009/001427, filed Feb. 27, 2009.
International Report on Patentability mailed on May 27, 2010, in corresponding International Application No. PCT/EP2009/001427.
International Search Report mailed on May 29, 2009, in corresponding International Patent Application No. PCT/EP2009/001427.

* cited by examiner

*Primary Examiner* — Khanh C Tran
(74) *Attorney, Agent, or Firm* — Christensen O'Connor Johnson Kindness PLLC

(57) ABSTRACT

The invention relates to a method for generating multi-antenna signals. Firstly, the propagation conditions between channel coefficients, which each describe one transmitter antenna and one receiver antenna, are generated. Furthermore, weighting factors are generated to weight signals to be transmitted via one transmitter antenna in each case. Taking the channel coefficients ($h_{ij}$) and the weighting factors ($W_{ij}$), into consideration, received signals arriving therein are calculated for each receiver antenna. A transmitted signal is generated in each case from the calculated arriving received signals, which corresponds to the calculated received signal for said receiving device. The particular transmitted signals are generated by a signal generator and transmitted to the associated receiving device.

4 Claims, 4 Drawing Sheets

ововATENT

METHOD FOR GENERATING MULTI-ANTENNA SIGNALS

BACKGROUND

1. Field of the Invention

The invention relates to a method for generating multi-antenna signals, wherein factors describing the propagation conditions in each case between a transmitter antenna and a receiver antenna and weighting factors for the weighting of signals to be transmitted in each case via a transmitter antenna are generated. Taking into consideration the weighting factors and the factors describing the propagation conditions, an incoming reception signal is calculated for every receiver antenna. A transmission signal, which corresponds to the calculated reception signal for this receiver antenna, is generated for each receiver antenna, and the transmission signal is transmitted by a signal generator to an allocated receiver antenna.

2. Description of Related Art

The simulation of a radio channel between a transmitter and a receiver for a MIMO system is known from the publication DE 11 2006 000 207 T5. In the disclosed method, a radio link between at least one interference signal source and the receiver is simulated in real time within a radio channel block. The simulation results of the interference, which are output from the radio channel block, are stored in a buffer. Following this, a radio link between the transmitter and the receiver is simulated in the radio channel block. The simulation results of the radio link, which are also output by the radio channel block, are added to an adder. The simulation results of the interference read out from the buffer are added to the simulation results of the radio link in real time by means of the adder. The final simulation results obtained within the adder in this method step are supplied in the form of an output signal to radio-frequency parts of a receiver.

The interference sources and also the transmitter can be either external signal sources or can be generated in a simulator. The signals from the transmitter are supplied by radio to the device for the implementation of the channel simulation, which comprises the radio-channel block and the buffer. The device for the implementation of the channel simulation is a unit separate from the transmitter. The input signal, which the transmitter supplies to the device for the implementation of the channel simulation, is a high-frequency signal.

Since the device for the implementation of the channel simulation and the transmitter are separate units, hardware components are required in both separate units for the implementation of the communication between the separate units. Accordingly, the system for the implementation of the channel simulation is complex and cost intensive. Moreover, a channel simulation cannot be implemented by the transmitter alone. An additional device, which occupies additional volume, is therefore always necessary for the channel simulation. The transmitter and the device for the implementation of the method must be individually adjusted for every implementation of the method. Accordingly, the disclosed method for channel simulation is complex.

SUMMARY

The invention is therefore based upon the object of providing a simple method for generating multi-antenna signals, which can be implemented in a simple, cost-saving manner with only one device.

This object is achieved by the method with the features of claim 1.

The method for generating multi-antenna signals comprises several method steps. The factors describing propagation conditions in each case between a transmitter antenna to be simulated and a receiver antenna and weighting factors for the weighting of signals to be transmitted, in each case via a transmitter antenna to be simulated, are generated. Conditions to be simulated can be displayed and/or described by these factors. Accordingly, the method according to the invention is also suitable for the simulation of signal transmissions. An incoming reception signal to be simulated is calculated for every receiver antenna to taking into consideration the weighting factors and the factors describing the propagation conditions. Such a simulated receiver-antenna-specific reception signal can therefore take into consideration general or receiver-antenna-specific conditions to be simulated or can contain their effect. For each receiver antenna, a transmission signal, which corresponds to the calculated reception signal to be simulated for this receiver antenna, is generated by a signal generator. The transmission signal is transmitted or transferred to an allocated real receiver antenna or respectively to a real receiver, for example, via cable.

Advantageous embodiments of the method according to the invention are presented in the dependent claims.

By preference, a baseband signal is transmitted from the signal generator to the reception device/s. Accordingly, an unnecessary modulation and demodulation of a signal to be transmitted to the real receiver can be avoided. The hardware cost, which is required for an unnecessary modulation and demodulation, can therefore be avoided.

In one advantageous embodiment, a high-frequency signal is transmitted. In this manner, simulated reception signals or signals can also be transmitted to real receivers, which can receive only high-frequency signals.

By preference, for the generation of a high-frequency signal, baseband signals are initially generated for every calculated reception signal. Accordingly, a signal to be transmitted to one or more real receivers can be output as a baseband signal or high-frequency signal from different positions of the signal path.

DESCRIPTION OF THE DRAWINGS

A preferred exemplary embodiment of the method according to the invention for generating multi-antenna signals is presented in the drawings and explained in greater detail in the description below. The drawings are as follows.

DETAILED DESCRIPTION

Figure 1:
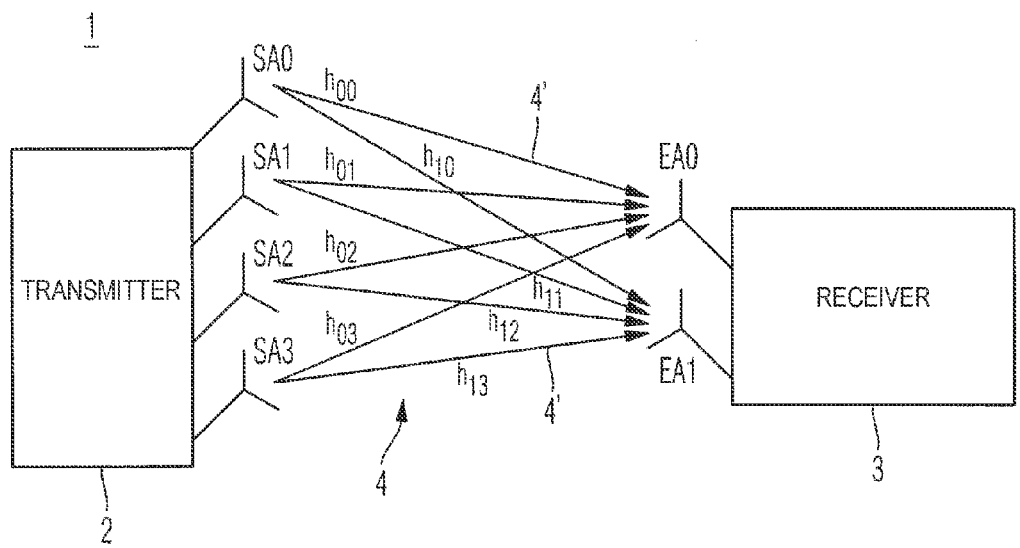
FIG. 1 shows a 4×2-MIMO system according to the prior art.
Figure 3:
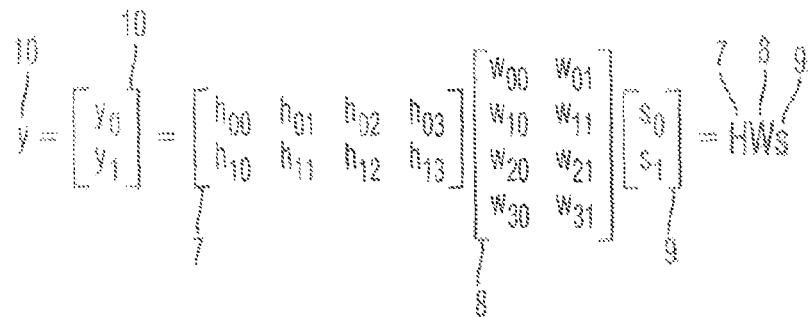
FIG. 3 shows a simple mathematical system model for a part of the simulation in matrix notation.

FIG. 1 shows a 4×2-MIMO system 1 from the prior art. In one exemplary embodiment of the method according to the invention, this MIMO system is simulated. The MIMO system 1 comprises a transmitter 2 to be simulated and a receiver 3. The transmitter 2 to be simulated and the receiver 3 are connected via a total channel 4 to be simulated. In the total channel 4 to be simulated, a high-frequency radio traffic takes place between the transmitter 2 to be simulated and the receiver 3. The transmitter 2 transmits start signals via the transmitter antennas SA0-SA3. The receiver 3 receives reception signals via its receiver antennas EA0, EA1. The total channel 4 is composed of several individual channels 4' to be simulated. In each case, the individual channels 4' to be simulated connect one of the transmitter antennas SA0, SA1, SA2, SA3 respectively to one of the receiver antennas EA0, EA1. Because the communication takes place via more than one individual channel 4' to be simulated, faster data rates, a higher signal-to-noise ratio or diversity gains can be achieved. A complex-value channel coefficient $h_{ij}$, which models the propagation conditions between the transmitter 2 and the receiver 3 in their respective individual channel to be simulated, is allocated to each of the individual channels 4' to be simulated. The complex-value channel coefficients $h_{ij}$ are recorded in a channel matrix 7, by means of which the propagation conditions between the transmitter 2 and the receiver 3 to be simulated in the total channel 4 to be simulated are modelled or respectively described. The channel matrix 7 is illustrated in FIG. 3. The reception signals to be simulated are calculated taking into consideration the channel matrix 7.

Figure 2:
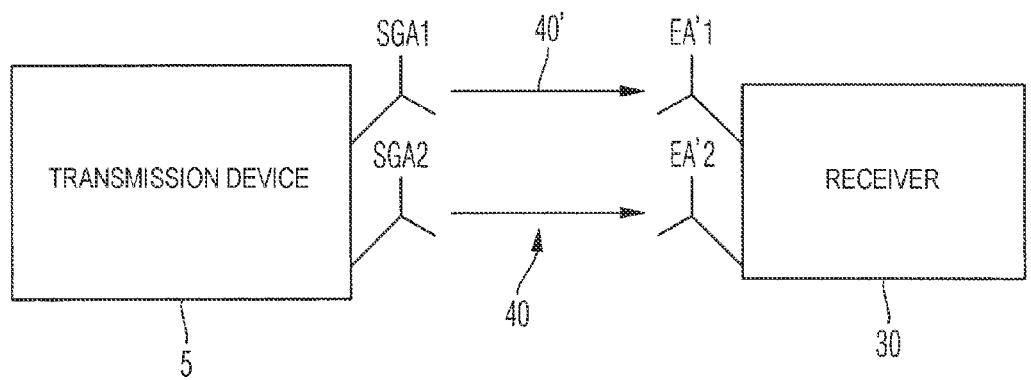
FIG. 2 shows an alternative to the 4×2-MIMO system from FIG. 1.

In FIG. 2, an alternative to the 4×2-MIMO system 1 from FIG. 1 is shown. The alternative comprises, for example, a signal generator as a transmission device 5 with a first transmission device antenna SG1 and a second transmission device antenna SG2. Within the transmission device 5, during the course of the implementation of a first, second or third exemplary embodiment 6, 6', 6'' of the method according to the invention, a simulation of the high-frequency radio traffic to be simulated between the transmitter 2 to be simulated and the receiver 3 to be simulated is implemented. The transmission device 5 communicates via the first transmission-device antenna SG1 and/or the second transmission-device antenna SG2 and via a total channel 40 with a first receiver antenna EA'1 and/or a second receiver antenna EA'2 of a receiver 30. The first transmission-device antenna SG1 and the first receiver antenna EA'1 or respectively the second transmission-device antenna SG2 and the second receiver antenna EA'2 are connected respectively via a single channel 40'. The communication via the single channels 40' takes place via radio. As an alternative, a baseband signal traffic between transmission device 5 and receiver 30 can take place. The baseband signal traffic can also be implemented via one or more cables. Instead of the radio connection, a cable-bound transmission can also be provided. A connecting bush is then provided in each case as a reception device instead of the receiver antennas EA1, EA2.

For the implementation of the simulation of the communication between the transmitter 2 to be simulated and the receiver 3 to be simulated, different matrices are used. In the matrices, coefficient are contained, which present information on the conditions to be simulated. Two such matrices are shown in FIG. 3. The channel matrix 7 contains channel coefficients $h_{ij}$ with information on the propagation conditions of the individual channels 4' to be simulated of the total channel 4 to be simulated. The weighting matrix 8 contains weighting coefficients $w_{k1}$ and with these information on the weighting of amplitude and phase for each of the transmitter antennas SA0, SA1, SA2, SA3 and to be simulated and for each of the receiver antennas EA0, EA1. The weighting matrix 8 describes conditions to be simulated. By multiplying the channel matrix 7 with the weighting matrix 8, a weighting-factor matrix A=HW is obtained, which contains coefficients with information on the communication to be simulated between the transmitter 2 to be simulated and the receiver 3 to be simulated. The reception signals to be simulated are therefore calculated taking into consideration the weighting matrix 8 or respectively the weighting-factor matrix A=HW. The weighting-factor matrix A=HW is multiplied by a first vector 9, of which the components $S_m$ represent transmitter signals or data symbols. The multiplication provides a second vector 10, of which the components $Y_n$, represent the receiver signals or respectively sub-carriers received at the receiver antennas EA0, EA1. The example explains an OFDM (orthogonal frequency division multiplex) system.

The first vector 9 is calculated in the transmission device 5 from baseband transmitter signals generated in the transmission device 5. The calculation of the first vector 9 takes into consideration modulation effects, which occur in the case of a modulation to be simulated of the baseband transmitter signals into high-frequency communications signals to be transmitted within the transmitter 2 to be simulated. The simulated baseband receiver signals are calculated in the transmission device 5 from the second vector 10. The calculation of the simulated baseband receiver signals from the second vector 10 takes into consideration demodulation effects, which occur in the case of a demodulation to be simulated of the received high-frequency communications signals within the receiver 3 to be simulated. Accordingly, the entire simulation is implemented within the transmission device 5. The simulation generates the simulated baseband receiver signals from the generated baseband transmission signals taking into consideration the simulation conditions without a real modulation or demodulation of baseband signals. The simulation accordingly takes place in the baseband.

Simulation conditions are presented and/or described by the channel matrix 7 and the weighting matrix 8. The channel matrix 7 and the weighting matrix 8 can be matched in each case to modified or selected simulation conditions. For this purpose, one or more channel coefficients $h_{ij}$ and/or one or more weighting coefficients $w_{k1}$ can be matched to the modified or selected simulation conditions.

Figure 4:
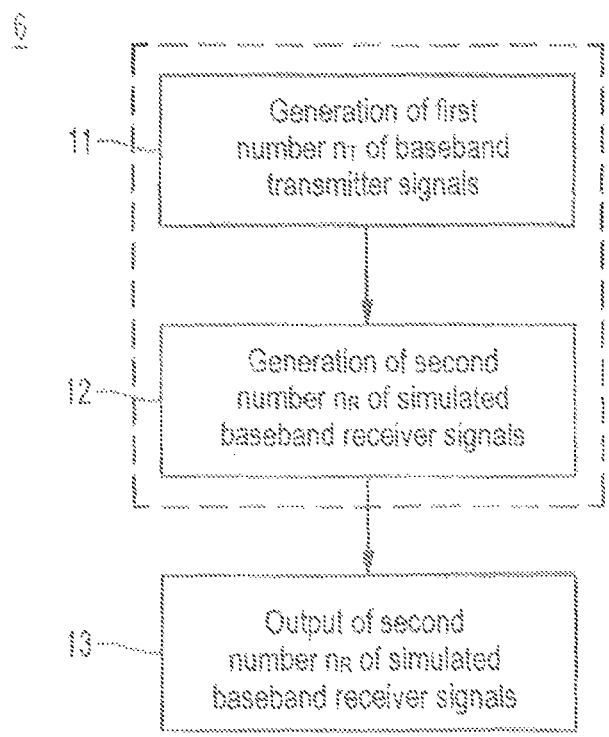
FIG. 4 shows a first exemplary embodiment of the method according to the invention.

A first exemplary embodiment 6 of the method according to the invention is presented in FIG. 4. In a first method step 11, the first number $n_T$ of baseband transmitter signals or start signals is generated within the transmission device 5. In a second method step 12, a second number $n_R$ of simulated baseband receiver signals or incoming reception signals or incoming reception signals to be simulated is generated in the transmission device 5 from the first number $n_T$ of baseband transmitter signals. The generation of the second number $n_R$ of simulated baseband receiver signals is implemented as described above. In a third method step 13, the second number $n_R$ of simulated baseband receiver signals is output by the transmission device 5. As a result, access can be gained to the simulation results without modulation or demodulation of the simulated baseband receiver signals. The real receiver 30 can be connected by means of one or more cables to the transmission device 5 for the signal transmission.

Figure 5:
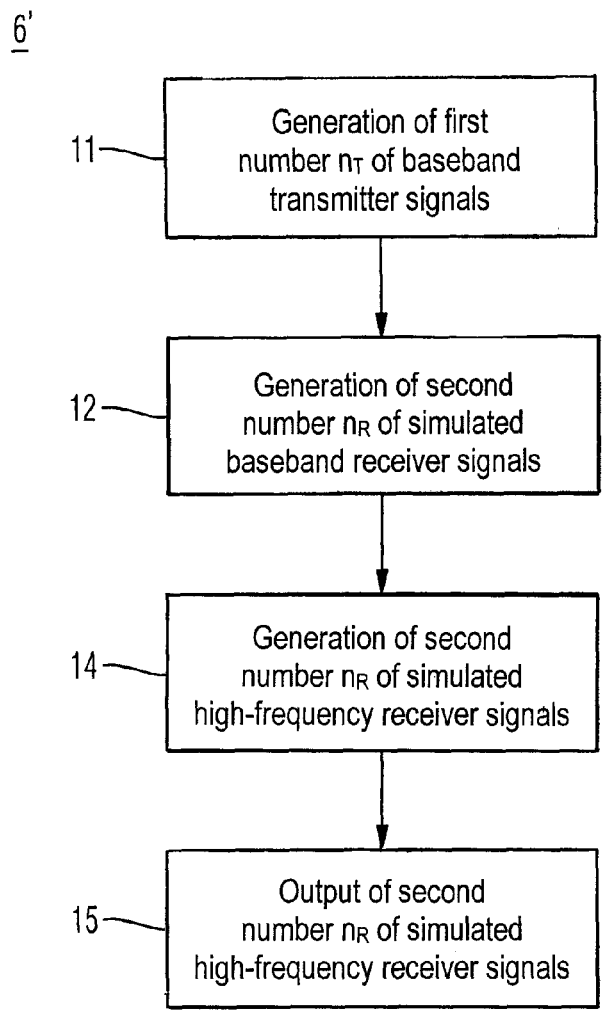
FIG. 5 shows a second exemplary embodiment of the method according to the invention.

A second exemplary embodiment 6' of the method according to the invention is presented in FIG. 5. The first and the second exemplary embodiment have the first method step 11 and the second method step 12 in common. In the second exemplary embodiment, an alternative, third method step 14, which is followed by a fourth method step 15, is implemented instead of the third method step 13. In the alternative third method step 14, the second number $n_R$ of high-frequency receiver signals is generated from the second number $n_R$ of simulated baseband receiver signals. The second number $n_R$ of simulated high-frequency receiver signals is disposed in the high-frequency range. The second number $n_R$ of simulated high-frequency receiver signals is output in the fourth method step 15 by the transmission device 5. The simulation results are output by the transmission device 5 by means of the second number $n_R$ of simulated high-frequency receiver signals via the signal device antennas SGA1, SGA2, and transmitted by radio over the total channel 40 to the receiver antennas EA'1, EA'2 of the real receiver 30.

Figure 6:
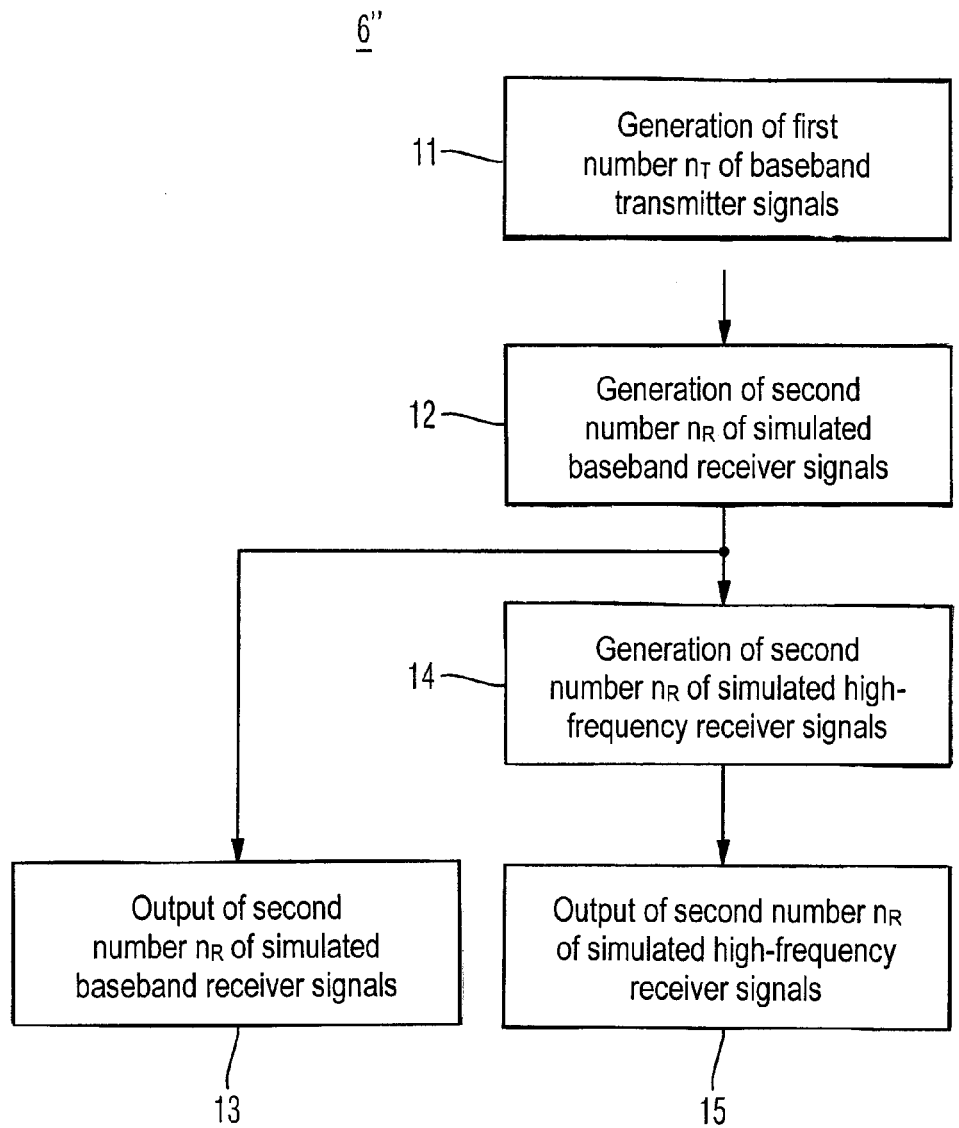
FIG. 6 shows a third exemplary embodiment of the method according to the invention.

In the third exemplary embodiment 6" illustrated in FIG. 6, the features of the first exemplary embodiment 6 and the features of the second exemplary embodiment 6' are combined. That is to say, the first, the second, the third, the alternative third, the fourth and the fifth method step are implemented. Accordingly, the advantages of the first and the second exemplary embodiment are combined. For example, the second number $n_R$ of simulated baseband receiver signals and also the second number $n_R$ of simulated high-frequency receiver signals can be supplied at the same time to a common device or each to a separate device. In each case, the device or the devices can evaluate the received signals or simulation results in an individual manner. Accordingly, time can be saved in a simulation analysis method, which analyses different simulation conditions in each case in a different manner or starting from different presentation forms. A simulation can be analysed simultaneously starting from several types or from several presentation forms.

The numbers $n_T$ and $n_R$ can be selected in each case independently of one another from the set of natural numbers and are finally determined by the underlying transmission method, for example, 3GPPLTE or WiMax. In order to generate multi-antenna signals, however, at least one of the numbers $n_T$ or $n_R$ must be greater than one. The number of rows and columns or coefficients in the matrices 7, 8 and also the number of components in the first vector 9 and in the second vector 10 depend upon $n_R$ and $n_T$.

The coefficients of the matrices 7, 8 can each be modified separately. Accordingly, different simulation conditions can be modelled. For example, propagation conditions in the total channel 4 to be simulated are simulated using the channel matrix 7. The different channel conditions or simulation conditions can be adjusted directly in the transmission device 5.

In one preferred exemplary embodiment of the method according to the invention for generating multi-antenna signals, all of the method steps through to the signal output are implemented by the transmission device 5. In the method for generating multi-antenna signals, the first number $n_T$ of baseband transmitter signals or start signals and the second number $n_R$ of simulated baseband receiver signals or incoming reception signals is generated in the transmission device 5. The baseband transmitter signal or the baseband transmitter signals are prepared for a simulation, which is implemented in the transmission device 5. The simulated baseband receiver signal generated by the simulation or respectively the simulated baseband receiver signals generated by the simulation contain the simulation results. The simulated baseband receiver signal or the simulated baseband receiver signals can be output by the transmission device 5 directly and/or after a further processing by the transmission device 5.

By particular preference, the weighting matrix 8 is used for the generation of the second number $n_R$ of simulated baseband receiver signals. The weighting matrix 8 contains the information on the weighting for amplitude and phase for every simulated transmitter antenna or transmitter antenna to be simulated of a transmitter to be simulated and for every simulated receiver antenna or receiver antenna to be simulated of a receiver to be simulated. Accordingly, the weighting matrix 8 presents one or more items of information on one or more simulation conditions. The generation of the second number $n_R$ of simulated baseband receiver signals accordingly takes into consideration the condition or conditions simulated.

By preference, at least one coefficient $w_{k1}$ of the weighting matrix is matched to the conditions to be simulated. With a matching of this kind of one or optionally more coefficients $w_{k1}$, information on different conditions to be simulated on or respectively in the simulated transmitter or its output can be presented or described through the weighting matrix 8 according to requirements.

In order to generate the second number $n_R$ of simulated baseband receiver signals, the channel matrix 7 is used by particular preference. Through the channel matrix 7, the total channel 4 between the transmitter 2 to be simulated with one or more transmitter antennas to be simulated or transmitter antennas SA0-SA3 and one receiver 3 with one or more antennas or receiver antennas EA0, EA1 is presented. Accordingly, the channel matrix 7 presents information on further simulation conditions. The generation of the second number $n_R$ of simulated high-frequency reception-antenna signals therefore also takes into consideration the further simulation conditions.

By preference, a coefficient $h_{ij}$ of the channel matrix is matched to the conditions to be simulated. By matching one or optionally more coefficients $h_{ij}$ of the channel matrix 7, information on the different conditions to be simulated in the total channel 4 to be simulated between the transmitter 2 to be simulated and receiver 3 to be simulated can be presented through the channel matrix 7.

In one advantageous exemplary embodiment, the second number $n_R$ of simulated baseband receiver signals is output by the transmitter device 5. The first number $n_T$ of baseband transmitter signals is further processed to form the second number $n_R$ of simulated baseband receiver signals. This further processing can be implemented using specific information on conditions to be simulated. Accordingly, it is possible to implement the simulation in the baseband. For the generation of the simulation result, neither a modulation nor a demodulation is necessary. The simulation result is present in the transmitter device 5 in the baseband. The result of the simulation is contained in the second number $n_R$ of simulated baseband receiver signals generated in the transmission device 5. Accordingly, access can be gained to this simulation result without the need to modulate, transmit, receive and/or subsequently demodulate the first number $n_T$ of baseband transmitter signals and/or the second number $n_R$ of simulated baseband receiver signals. Accordingly, an unnecessary modulation of the first number $n_T$ of baseband transmitter signals into high-frequency signals for the subsequent implementation of a simulation is avoided. A demodulation of high-frequency signals, which are the result of a simulation, for the generation of the second number $n_R$ of simulated baseband receiver signals, can therefore also be avoided. In total, the method is therefore very hardware-economical, cost saving and simple to implement.

In one preferred exemplary embodiment, the second number $n_R$ of simulated high-frequency receiver signals is generated from the second number $n_R$ of simulated baseband receiver signals. These simulated high-frequency receiver signals can be supplied from the transmission device to a receiver, for example, via radio or cable connection.

By preference, the second number $n_R$ of simulated high-frequency receiver signals is output by the transmission device 5. In this context, the number of transmission antennas SGA1, SGA2 of the transmission device 5 used or respectively the number of reception antennas or receiver antennas EA'1, EA'2 of the real receiver 30 used can be selected freely.

By preference, both numbers are identical. As an alternative, one or more cables can be used instead of antenna cable connections and instead of a radio link.

Simulation results can be supplied to the real receiver 30 via the second number $n_R$ of simulated baseband receiver signals in the baseband and/or via the second number $n_R$ of simulated high-frequency reception-antenna signals in the high-frequency range. The signals to be transmitted are generated by a signal generator, in which the simulation according to the invention of the transmission paths is also implemented.

The invention is not restricted to the exemplary embodiments presented. On the contrary, individual features of the exemplary embodiments can also be advantageously combined with one another.

The invention claimed is:

1. A method for generating multi-antenna signals for a simulation of a radio link between a transmitter and a receiver, the method comprising:

allocating of channel coefficients matched to modified or selected simulation conditions, the channel coefficients describing the propagation conditions to be simulated in each case between a transmitter antenna and a receiver antenna in the simulated radio link;

generating, by a transmission device, weighting factors for the weighting of signals to be transmitted in each case via a transmitter antenna conditions to be simulated;

calculating, by the transmission device, an incoming reception signal affected by the propagation conditions to be simulated and the weighting of signals to be transmitted, wherein the incoming reception signal is calculated for each receiver based in part on the weighting factors and the channel coefficients;

generating, by a signal generator of the transmission device, a receiver signal for each receiver antenna, which corresponds to the calculated reception signal for this receiver antenna; and transmitting, for each receiver antenna, the generated receiver signal from the transmission device to an allocated reception device via a single channel for an implementation of a communication between the transmitter and the allocated reception device via the simulated radio link.

2. The method according to claim 1, wherein a baseband signal is transmitted.

3. The method according to claim 1, wherein a high-frequency signal is transmitted.

4. The method according to claim 3, wherein, for the generation of the high-frequency signal, a baseband signal is initially generated for every calculated reception signal.

* * * * *